US011950130B2

(12) United States Patent
Polehn et al.

(10) Patent No.: US 11,950,130 B2
(45) Date of Patent: Apr. 2, 2024

(54) SYSTEMS AND METHODS FOR RATE CONTROL OF INGRESS TRAFFIC IN A RADIO ACCESS NETWORK

(71) Applicant: Verizon Patent and Licensing Inc., Basking Ridge, NJ (US)

(72) Inventors: Donna L. Polehn, Mercer Island, WA (US); Jin Yang, Orinda, CA (US); Ratul K. Guha, Warwick, PA (US); Yair Dory, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 187 days.

(21) Appl. No.: 17/181,898

(22) Filed: Feb. 22, 2021

(65) Prior Publication Data
US 2022/0272567 A1   Aug. 25, 2022

(51) Int. Cl.
*H04W 28/02* (2009.01)
*H04W 28/10* (2009.01)
*H04W 28/22* (2009.01)

(52) U.S. Cl.
CPC ... *H04W 28/0289* (2013.01); *H04W 28/0268* (2013.01); *H04W 28/10* (2013.01); *H04W 28/22* (2013.01)

(58) Field of Classification Search
CPC ......... H04W 28/0289; H04W 28/0268; H04W 28/10; H04W 28/22
See application file for complete search history.

(56) References Cited

U.S. PATENT DOCUMENTS

| | | | |
|---|---|---|---|
| 2014/0241154 A1* | 8/2014 | Stanwood | H04N 21/234327 370/230 |
| 2019/0165890 A1* | 5/2019 | Pietraski | H04L 5/0044 |
| 2020/0195539 A1* | 6/2020 | Sivaraj | H04W 28/0992 |
| 2020/0383004 A1* | 12/2020 | Hande | H04L 47/805 |
| 2021/0377804 A1* | 12/2021 | Sivaraj | H04W 28/10 |
| 2023/0072769 A1* | 3/2023 | Yeh | H04W 28/0858 |

* cited by examiner

*Primary Examiner* — Donald L Mills

(57) ABSTRACT

A system described herein may provide a technique for the rate-controlled forwarding of traffic to a base station of a radio access network ("RAN"). The rate of the forwarding of the traffic may be based on a latency sensitivity of the traffic, metrics associated with the base station, and an ingress capacity of the base station. The metrics associated with the base station may include congestion and/or load metrics, radio frequency ("RF") metrics, or other suitable metrics. The latency sensitivity of the traffic may be determined based on a source and/or destination of the traffic, a network slice associated with the traffic, or other suitable traffic attributes. After receiving the rate-controlled traffic, the base station may perform scheduling and/or queueing of the traffic in order to wirelessly provide the traffic to one or more User Equipment ("UEs").

20 Claims, 11 Drawing Sheets

SYSTEMS AND METHODS FOR RATE CONTROL OF INGRESS TRAFFIC IN A RADIO ACCESS NETWORK

BACKGROUND

Wireless networks may include a core network, which may provide downlink traffic to one or more radio access networks ("RANs") for wireless transmission to respective User Equipment ("UEs") to which the traffic is destined. The RANs may include schedulers, queues, etc. that are used to allocate radio frequency ("RF") resources associated with the RANs in order to provide the traffic to respective UEs in accordance with applicable Quality of Service ("QoS") rules or policies, which may specify latency metrics, throughput metrics, and/or other metrics for the traffic

DETAILED DESCRIPTION OF EXAMPLE EMBODIMENTS

Figure 1:
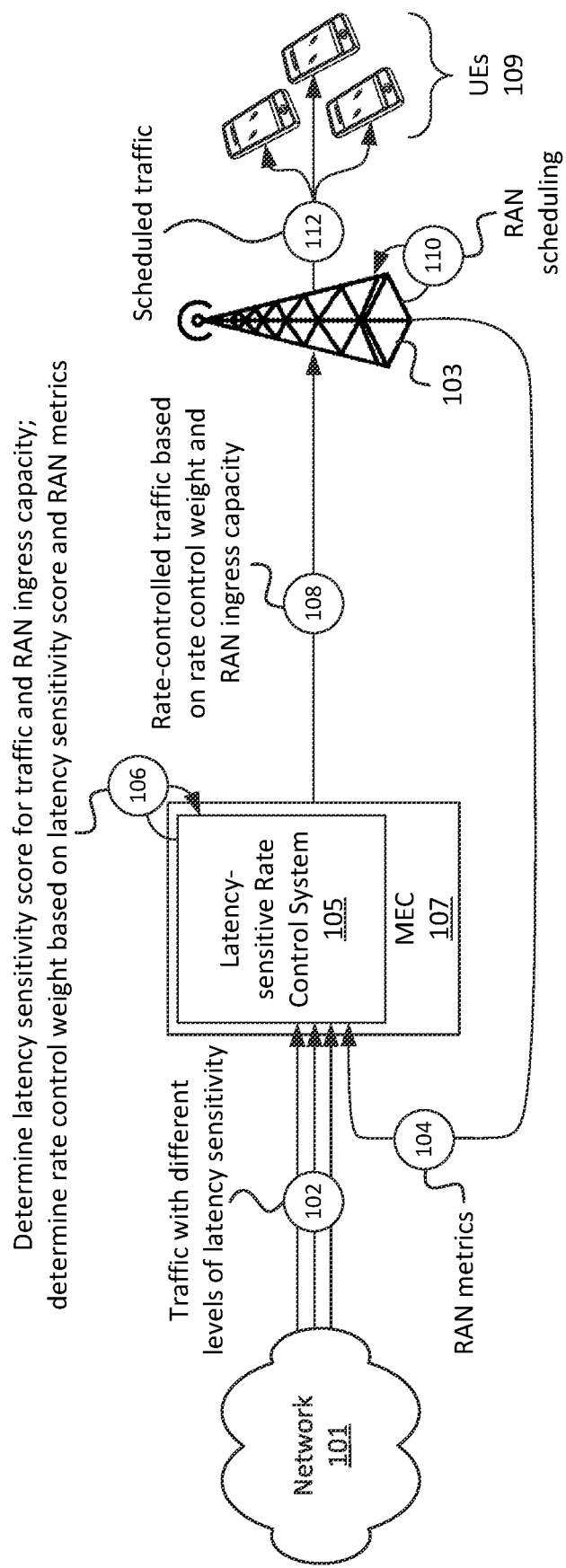
FIG. 1 illustrates an example overview of one or more embodiments described herein.

The following detailed description refers to the accompanying drawings. The same reference numbers in different drawings may identify the same or similar elements.

Wireless networks may include RANs that serve as a wireless interface between a User Equipment ("UE")—such as a mobile telephone, tablet computer, Machine-to-Machine ("M2M") device, wearable device, Internet of Things ("IoT") device, or the like—and a core network that provides routing, session management, and other services. When "downlink" traffic is received for a UE (e.g., from an application server, from another UE, and/or some other source), the core network may forward such traffic to one or more base stations of a RAN in accordance with the base stations' maximum traffic ingress capacity, and the RAN may perform scheduling and/or other resource allocation in order to provide the received traffic to the UE.

Some traffic may be more latency-sensitive than other traffic, such as gaming traffic, augmented reality ("AR") traffic, and/or other traffic related to latency-sensitive applications. In situations where a RAN experiences congestion, radio frequency ("RF") conditions such as interference, or other phenomena, the scheduling and/or resource allocation at the RAN may not necessarily account for traffic types or latency sensitivity of certain traffic, and may therefore introduce jitter, increase latency, and/or otherwise impact the delivery of latency-sensitive traffic.

As described herein, some embodiments may determine the latency sensitivity of traffic, and may modify the amount or rate at which traffic is provided to a RAN in order to optimize the delivery of latency-sensitive traffic. For example, as described herein, latency-sensitive traffic may be provided to a RAN at a lesser rate than the RAN's capacity to handle ingress traffic (referred to herein as "RAN ingress capacity"), such that RAN conditions (e.g., congestion, interference, etc.) may be mitigated or overcome by the reduced amount of buffered traffic to be wirelessly provided to UEs via the RAN. For example, if the rate at which traffic is provided to the RAN is lower than the RAN ingress capacity, then the RAN may have more flexibility and/or may otherwise be more likely to prioritize and/or schedule such traffic in a manner that minimizes latency of the traffic.

RAN ingress capacity may be specified by a manufacturer, vendor, etc. associated with particular RAN components, such as base stations, routers, and/or other network devices associated with a given RAN. In some embodiments, RAN ingress capacity may be determined using artificial intelligence/machine learning ("AI/ML") techniques or other suitable techniques, which may determine the RAN ingress capacity for a given RAN based on simulations and/or real-world data. Such techniques may identify the RAN ingress capacity based on optimizing a "yield" associated with the RAN based on the RAN ingress capacity, where the yield may be measured or indicated by performance metrics such as throughput, latency, jitter, etc. and/or other metrics. In some embodiments, RAN ingress capacity may be equal to, may be derived from, may be a function of, and/or may otherwise be based on an egress capacity of the RAN, where the "egress capacity" refers to a rate at which the RAN (e.g., a base station of the RAN) is able to wirelessly transmit traffic to connected UEs.

The amount or rate at which traffic is provided to a RAN, in accordance with some embodiments, may further be based on RAN metrics, such as congestion metrics, RF metrics (e.g., signal to noise ratio ("SNR") metrics, Signal-to-Interference-and-Noise-Ratio ("SINR") metrics, Received Signal Strength Indicator ("RSSI") metrics, Reference Signal Receive Power ("RSRP") metrics, Reference Signal Received Quality ("RSRQ") metrics, Channel Quality Indicator ("CQI") metrics, and/or other measures of channel or signal quality), or other information. As another example, for traffic that is relatively less latency-sensitive and/or is not latency-sensitive, such traffic may be provided at or above the RAN ingress capacity. Providing traffic at or above the RAN's ingress capacity may improve the throughput of such traffic, as the RAN may be more likely to utilize all available RF resources (e.g., Physical Resource Blocks ("PRBs")) when scheduling the wireless transmission of the traffic if the rate of ingress traffic is relatively high.

As shown in FIG. 1, for example, network 101 may output (at 102) downlink traffic toward base station 103. Network 101 may be, may include, and/or may be communicatively coupled to a core of a wireless network, such as an Evolved Packet Core ("EPC"), a Fifth Generation Core ("5GC"), and/or some other type of core network. In some embodiments, network 101 may be, may include, and/or may be communicatively coupled to a Packet Data Network ("PDN"), such as the Internet. Base station 103 may be a base station of a Long-Term Evolution ("LTE") RAN, a Fifth Generation ("5G") RAN, and/or some other type of RAN. In some embodiments, base station 103 may be, may include, may be implemented by, and/or may be communicatively coupled to an evolved Node B ("eNB"), a Next Generation Node B ("gNB"), and/or some other type of base station.

In some embodiments, Latency-sensitive Rate Control System ("LRCS") 105 may be within a routing path of the traffic output (at 102) by network 101. For example, LRCS 105 may be, may implement, may be implemented by, and/or may be communicatively coupled to a routing and/or network device such as a router, a hub, a switch, or the like. In some embodiments, the traffic may be provided (at 102) via one or more backhaul links between network 101 and LRCS 105. In some embodiments, LRCS 105 may be implemented by Multi-Access/Mobile Edge Computing ("MEC") device 107, referred to sometimes herein simply as "MEC 107." As discussed below, multiple MECs 107 may be located at "edges" of the RAN, and may perform processing and/or computations on traffic without the need for the traffic to traverse network 101 and/or other networks. In some embodiments, LRCS 105 may be implemented at base station 103 (e.g., by a same device or system that implements some or all of the functionality of base station 103).

The traffic may be received (at 102) from a router, switch, gateway, and/or other suitable device or system that provides traffic from network 101. In some embodiments, the traffic may be received from a Packet Data Network ("PDN") Gateway ("PGW") associated with network 101 (e.g., a PGW-User Plane ("PGW-U"), a User Plane Function ("UPF"), and/or some other device or system associated with network 101.

The traffic (output at 102) may be associated with various levels of latency sensitivity. For example, some traffic may be relatively latency-sensitive, such as gaming traffic, AR traffic, voice call traffic, or the like. On the other hand, some of the traffic may be relatively latency-insensitive (or relatively less latency-sensitive), such as video or audio streaming traffic, file download traffic, or the like. The latency sensitivity of certain traffic may be identified by LRCS 105 based on header information and/or other suitable information associated with respective traffic. For example, some or all of a 5-tuple associated with the traffic (e.g., where a "5-tuple" refers to a source address (e.g., Internet Protocol ("IP") address or other suitable address), source port, destination address, destination port, and protocol) may be mapped to an indicator or score of latency sensitivity. In some embodiments, latency sensitivity may be identified based on a QoS flow associated with the traffic. As another example, certain traffic types and/or applications may be associated with particular indicators or scores of latency sensitivity (e.g., where the traffic type and/or application may be indicated in header information of the traffic, and/or may be determined based on deep packet inspection ("DPI")). As another example, different network slices may be associated with particular indicators or scores of latency sensitivity, where "network slices" refer to discrete sets of network resources used for different categories, classes, etc.

of traffic. The discrete sets of network resources may provide differentiated levels of service to the different categories, classes, etc. of traffic.

An indicator of latency sensitivity may, in some embodiments, include a category identifier such as "highly latency-sensitive," "moderately latency-sensitive," "latency-insensitive," and/or some other suitable identifier or classification. Additionally, or alternatively, a given 5-tuple, traffic type and/or application, network slice, or other set of differentiating traffic attributes may be associated with a latency sensitivity score, such as on a scale of 1-100 or some other suitable scale. For example, a relatively low latency sensitivity score (e.g., a score of about 1) may indicate a relatively low latency sensitivity, while a relatively high latency sensitivity score (e.g., a score of about 100) may indicate a relatively high latency sensitivity. In some embodiments, a relatively low latency sensitivity score (e.g., a score of about 1) may indicate a relatively high latency sensitivity, while a relatively high latency sensitivity score (e.g., a score of about 100) may indicate a relatively low latency sensitivity.

The latency sensitivity of traffic having particular attributes (e.g., a particular 5-tuple or portion thereof, a particular network slice, a particular traffic or application type, etc.) may be determined based on AI/ML techniques or other suitable techniques. For example, the latency sensitivity scores for certain traffic may be determined such that a yield associated with delivery of the traffic is optimized, where such yield may be based on performance metrics (e.g., latency, throughput, jitter, etc.), subjective feedback (e.g., indications of satisfactory or unsatisfactory user experience from users associated with one or more UEs 109 that receive such traffic), and/or other suitable feedback information.

As further shown, base station 103 may provide (at 104) RAN metrics to LRCS 105. In some embodiments, LRCS 105 may communicate with base station 103 via an X2 interface, an Xn interface, a Control to Data Plane Interface ("CDPI"), an application programming interface ("API"), and/or some other suitable communication pathway. The RAN metrics may be provided periodically, intermittently, and/or otherwise on an ongoing basis. In this manner, LRCS 105 may "monitor" the RAN metrics associated with base station 103 and/or one or more other base stations 103. As noted above, the RF metrics may include metrics such as SINR metrics, RSSI metrics, CQI metrics, and/or other measures of channel or signal quality. In some embodiments, the RAN metrics may include congestion metrics, such as a quantity of UEs connected to base station 103, a measure of the amount or proportion of RF resources (e.g., PRBs) associated with base station 103 that are utilized and/or available, buffer state information associated with base station 103, and/or other measures of congestion or load. The RAN metrics may be measured or determined by base station 103, may include and/or may be based on measurements or information from one or more other base stations 103 (e.g., where such base stations 103 communicate via an X2 interface, an Xn interface, or some other suitable interface), may include and/or may be based on measurements or information from one or more UEs 109 connected to or within range of base station 103 (e.g., based on measurement reports from such UEs 109), and/or may be measured or determined by some other device or system. In some embodiments, in addition to, or in lieu of, receiving (at 104) the RAN metrics from base station 103, LRCS 105 may receive such RAN metrics from one or more other device or systems, such as a Service Capability Exposure Function ("SCEF") associated with network 101, a Network Exposure Function ("NEF") associated with network 101, and/or some other suitable device or system.

LRCS 105 may further determine (at 106) one or more latency sensitivity scores for the traffic (received at 102), and may determine a rate control weight based on the latency sensitivity score(s) associated with the traffic and further based on the RAN metrics (received at 104). As discussed below, the rate control weight may be used to determine a rate at which the received (at 102) traffic is forwarded, routed, etc. to base station 103. As further discussed below, multiple latency sensitivity scores may be determined for the traffic, such as different latency sensitivity scores for different traffic and/or application types, traffic associated with different network slices, traffic associated with different 5-tuples (or portions thereof), etc. Additionally, or alternatively, as also discussed below, an aggregate latency sensitivity score may be generated for traffic having different attributes, such as an aggregate latency sensitivity score for multiple different traffic and/or application types, traffic associated with multiple different network slices, traffic associated with multiple different 5-tuples (or portions thereof), etc.

Similarly, LRCS 105 may determine different rate control weights for different traffic and/or application types, traffic associated with different network slices, traffic associated with different 5-tuples (or portions thereof), etc. Additionally, or alternatively, an aggregate rate control weight may be generated for traffic having different attributes, such as an aggregate rate control weight for multiple different traffic and/or application types, traffic associated with multiple different network slices, traffic associated with multiple different 5-tuples (or portions thereof), etc.

A particular rate control weight (determined at 106) may be based on a particular latency sensitivity score associated with particular traffic, as well as RAN metrics associated with base station 103. For example, as discussed below, if the RAN metrics indicate that base station 103 is relatively highly loaded and/or highly congested, and/or is experiencing relatively poor RF conditions (e.g., high interference, low channel quality, etc.), the rate control weight may be relatively lower (e.g., where a "lower" rate control weight may be associated with a lower rate at which the traffic is provided to base station 103 by LRCS 105, in some embodiments). On the other hand, if the RAN metrics indicate that base station 103 is relatively less loaded and/or less congested, and/or is experiencing relatively conducive RF conditions (e.g., low interference, high channel quality, etc.), the rate control weight may be relatively higher. Further, if the latency sensitivity score for the traffic indicates that the traffic is relatively latency-sensitive, the rate control weight may be relatively lower, while if the latency sensitivity score for the traffic indicates that the traffic is relatively less latency-sensitive or is latency-insensitive, the rate control weight may be relatively higher.

Thus, in some embodiments, the rate control weight for particular traffic may be a function of the latency sensitivity score(s) associated with the particular traffic, as well as the RAN metrics associated with base station 103. In some embodiments, the latency sensitivity scores and RAN metrics may factor in differently to the rate control weight based on differing values of the latency sensitivity scores and/or RAN metrics. For example, if the latency sensitivity score for traffic indicates that the traffic is relatively less latency-sensitive, then the RAN metrics may be less of a factor in determining the rate control weight than a situation in which traffic is relatively more latency-sensitive.

In some embodiments, some types of traffic and/or particular latency sensitivity scores may be determinative for the rate control weight. For example, for such types of traffic and/or latency sensitivity scores, the RAN metrics may not be a factor in determining the rate control weight. For example, traffic with a latency sensitivity score that is below a threshold, such as a latency sensitivity score of 1 out of 100, a score of 10 or below out of 100, etc., may be latency-insensitive enough that the RAN metrics may not be a significant factor in the determination of the rate at which traffic should be sent to base station 103. For example, in such situations, LRCS 105 may determine that the traffic should be provided at a relatively high rate, a maximum rate, etc. to base station 103, in order to maximize the potential throughput of the traffic.

As another example, traffic with a latency sensitivity score that exceeds a threshold, such as a latency sensitivity score of 100 out of 100, a score of about 90 or above out of 100, etc., may be latency-sensitive enough that the RAN metrics may not be a significant factor in the determination of the rate at which traffic should be sent to base station 103. For example, in such situations, LRCS 105 may determine that the traffic should be provided at a relatively low rate to base station 103, in order to minimize the potential latency of the traffic. In such situations, the relatively low rate may be based on a data rate associated with the traffic, which may be determined based on the 5-tuple of the traffic, traffic and/or application type, network slice, etc. For example, for particular gaming traffic associated with a data rate of 50 Kilobytes per second ("KB/s"), the rate control weight may be determined such that the traffic is provided to base station 103 at about 50 KB/s. In other situations, traffic may have a latency sensitivity score in between such threshold scores, such that the rate control weight may be determined based on a "sliding scale," in which the rate control weight may vary accordingly with different latency sensitivity scores and/or different RAN metrics.

In some embodiments, the rate control weight may be a coefficient, factor, etc. that is applied to the RAN ingress capacity associated with base station 103. As noted above, base station 103 may be associated with a RAN ingress capacity which may be based on hardware and/or software capabilities of base station 103, may be determined using AI/ML or other suitable techniques, etc. For example, as noted above, for relatively latency-sensitive traffic and/or when the RAN metrics indicate that base station 103 is relatively congested and/or is experiencing relatively poor RF conditions, the rate control weight may be a value that is between 0 and 1. Accordingly, when outputting (at 108) the traffic to base station 103, the rate at which such traffic is provided by LRCS 105 may be lower than the RAN ingress capacity associated with base station 103 (e.g., 50% of the RAN ingress capacity, 80% of the RAN ingress capacity, or some other amount that is lower than the RAN ingress capacity).

On the other hand, for traffic that is relatively latency-insensitive and/or when RAN metrics indicate that base station 103 is relatively not congested and/or is experiencing relatively conducive RF conditions, the rate control weight may be a value that is at or above 1. Accordingly, when outputting (at 108) the traffic to base station 103, the rate at which such traffic is provided by LRCS 105 may at or above the RAN ingress capacity associated with base station 103 (e.g., 100% of the RAN ingress capacity, 110% of the RAN ingress capacity, or some other amount that is at or above than the RAN ingress capacity). In some embodiments, for traffic that is relatively latency-insensitive and/or when RAN metrics indicate that base station 103 is relatively not congested and/or is experiencing relatively conducive RF conditions, the rate control weight may be a value that is below 1, where such weight may still be higher than situations in which traffic is relatively latency-sensitive and/or when RAN metrics indicate that base station 103 is relatively congested and/or is experiencing relatively poor RF conditions.

LRCS 105 may further output, route, etc. (at 108) the traffic to base station 103 at a rate that is based on the rate control weight and the RAN ingress capacity (e.g., as discussed above). In some embodiments, LRCS 105 may implement a "leaky bucket" technique, in which traffic (received at 102) that is not output (at 108) to base station 103 within a threshold window of time may be dropped. For example, if the traffic is received (at 102) at a faster rate than is output (at 108), some of the traffic may be dropped, and LRCS 105 may output a notification (e.g., a non-acknowledgement message ("NACK") or other suitable message) to network 101 indicating that such traffic was dropped. Since the rate at which the traffic is output (at 108) is based on the latency sensitivity of the traffic and is further based on RAN metrics associated with base station 103, embodiments described herein may ensure that the delivery of the traffic is performed in a manner that preserves latency and/or throughput objectives of the traffic (e.g., based on the latency sensitivity of the traffic), without requiring modifications to queuing and/or scheduling performed by base station 103 based on RAN conditions.

For example, once base station 103 receives (at 108) the rate-controlled traffic, base station 103 may perform (at 110) scheduling, queuing, etc. based on one or more factors. For example, the scheduling, queuing, etc. may be performed in order to wirelessly transmit (at 112) the traffic to its respective destination, which may include one or more UEs 109 that are connected to base station 103. While not described in detail here, the RAN scheduling (at 110) may be performed based on available and/or utilized PRBs associated with base station 103, Quality of Service ("QoS") levels and/or Service Level Agreements ("SLAs") associated with respective UEs 109, QoS levels and/or SLAs associated with particular traffic, and/or other factors. As noted above, in situations where an ingress buffer associated with base station 103 is relatively full or over capacity, latency-sensitive traffic may not be delivered (at 112) in a timely manner, thus potentially introducing excessive latency, jitter, and/or packet loss associated with such traffic. The rate-controlled delivery (at 108) of such traffic may serve to alleviate or eliminate situations in which one or more ingress buffers associated with base station 103 become congested, full, etc., and may therefore reduce or eliminate the possibility of latency-sensitive traffic being delivered (at 112) to UEs 109 in a manner that introduces excess latency, jitter, and/or packet loss.

Figure 2:
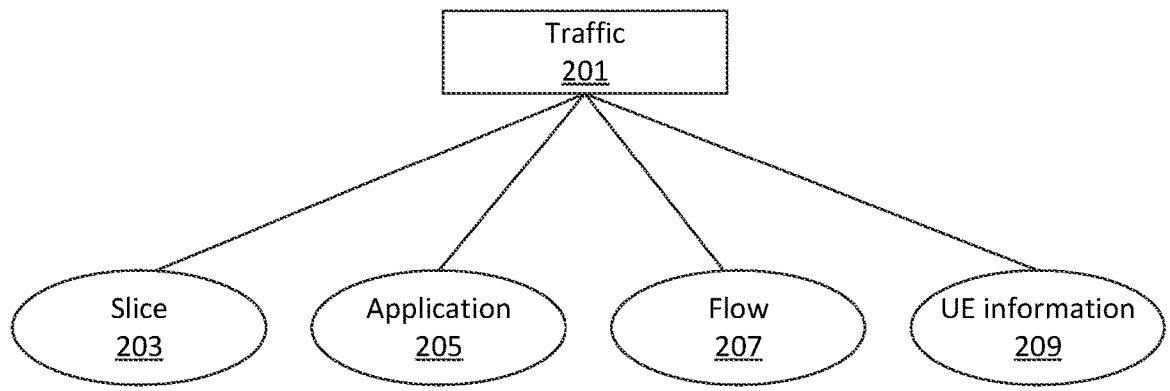
FIG. 2 illustrates attributes of traffic, based on which a latency score may be generated, in accordance with one or more embodiments described herein.

FIG. 2 illustrates an example of traffic attributes that may be used to determine the latency-sensitivity of traffic (e.g., as received at 102). As shown, for example, particular traffic 201 may be associated with slice information 203, application information 205, flow information 207, and/or UE information 209. In some embodiments, "traffic 201" may refer to a packet, a frame, a set of packets received over time, and/or some other arrangement of traffic received from network 101. Some or all of the information 203-209 may be determined (e.g., by LRCS 105 and/or some other device or system) based on header information associated with the traffic, payload information (e.g., as identified using DPI or other suitable techniques), and/or based on information or metadata received from one or more other devices or systems.

Slice information 203 may indicate, for example, a particular network slice associated with traffic 201. Slice information 203 may be indicated by, for example, a Network Slice Selection Assistance Information ("NSSAI") value included in the traffic, a slice identifier, and/or some other indication of a particular network slice. In some embodiments, slice information 203 may additionally, or alternatively, indicate one or more QoS levels associated with the traffic (e.g., a QoS Class Identifier ("QCI"), a QoS Flow Identifier ("QFI"), or the like).

Application information 205 may indicate a traffic type and/or application associated with the traffic. For example, application information 205 may include a name or identifier of an application with which the traffic is associated with. In some embodiments, application information 205 may include a type of application, such as a voice call application, a video conferencing application, an audio and/or video streaming application, a gaming application, an AR application, or the like.

Flow information 207 may indicate one or more logical flows, bearers, sessions, etc. associated with the traffic. In some embodiments, flow information 207 may include and/or may be derived from a 5-tuple associated with the traffic. In some embodiments, flow information 207 may include a flow identifier or other suitable indicator of a logical flow, session, etc. associated with the traffic.

UE information 209 may include an identifier of a given UE 109 with which the traffic is associated (e.g., a particular UE 109 to which the traffic is destined), such as an IP address and/or port number, a Mobile Directory Number ("MDN"), an International Mobile Station Equipment Identity ("IMEI") value, an International Mobile Subscriber Identity ("IMSI") value, a Subscription Permanent Identifier ("SUPI"), a Globally Unique Temporary Identifier ("GUTI"), and/or some other suitable identifier of UE 109. In some embodiments, some or all of the information 203-207 may be determined based on UE information 209. For example, LRCS 105 may communicate with a UE information repository (e.g., a Unified Data Management function ("UDM"), a Home Subscriber Server ("HSS"), or some other UE information repository associated with network 101) to identify some or all of information 203-207 based on a lookup of UE information 209 in such UE information repository.

Figure 3:
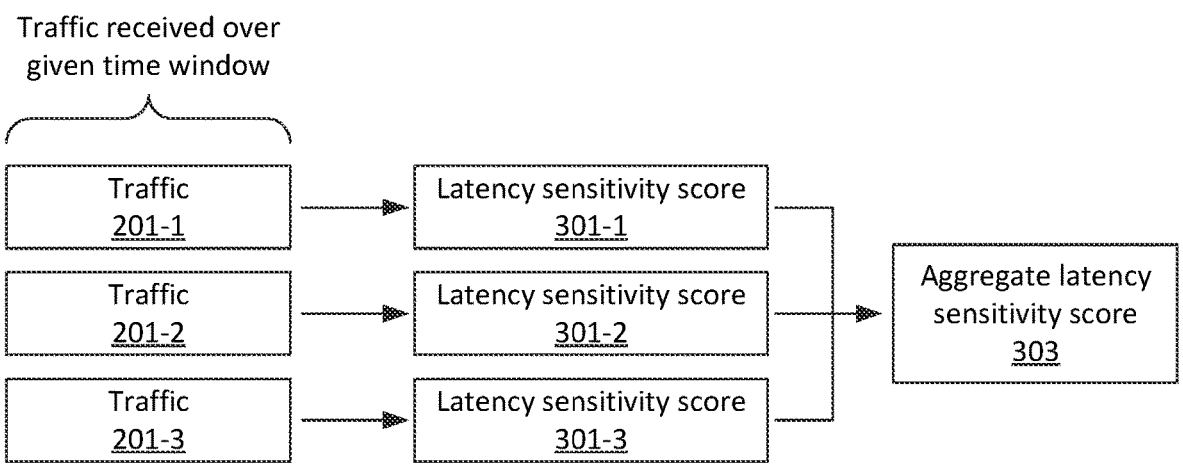
FIG. 3 illustrates the generation of an aggregate latency score for a set of traffic including different traffic types, in accordance with one or more embodiments described herein.

As mentioned above, traffic 201 having different attributes (e.g., different sets of information 203-209) may be received (e.g., at 102) over time, and an aggregate latency sensitivity score may be determined for the traffic, based on which a rate control weight may be determined (at 106) for traffic 201 as a whole. For example, as shown in FIG. 3, three different sets of traffic 201-1, 201-2, and 201-3 may be received (e.g., at 102) by LRCS 105. Traffic 201-1, 201-2, and/or 201-3 may have one or more attributes that are different, such as different slice information 203, application information 205, flow information 207, and/or UE information 209. In some situations, traffic 201-1, 201-2, and/or 201-3 may have at least one attribute in common, such as the same slice information 203, application information 205, flow information 207, and/or UE information 209.

As one example, traffic 201-1, 201-2, and 201-3 may all be associated with the same slice information 203 (e.g., the same network slice and/or a same group of network slices), but different application information 205. For example, traffic 201-1 may be associated with gaming traffic, traffic 201-2 may be associated with voice call traffic, and traffic 201-3 may be associated with file download traffic.

As another example, traffic 201-1, 201-2, and 201-3 may be associated with the same slice information 203 and application information 205 (e.g., the same network slice and the same application), but for different UE information 209 (e.g., different UEs 109). For example, the different UEs 109 may be associated with different QoS levels and/or SLAs.

Based on the different attributes of traffic 201-1, 201-2, and 201-3, LRCS 105 may generate (e.g., 106) respective latency sensitivity scores 301-1, 301-2, and 301-3. For example, latency sensitivity score 301-1 may be associated with traffic 201-1, latency sensitivity score 301-2 may be associated with traffic 201-2, and latency sensitivity score 301-3 may be associated with traffic 201-3. As noted above, the different latency sensitivity scores 301 may reflect the latency sensitivity of the respective traffic 201 with which the latency sensitivity scores 301 are associated. For example, in the example above where some or all of information 203-207 is the same for traffic 201-1, 201-2, and 201-3, but such traffic is associated with different UE information 209, the different UEs 109 may be associated with different QoS levels, SLAs, etc. based on which latency sensitivity scores 301 may be different for the respective traffic 201 associated with such UEs 109.

In some embodiments, LRCS 105 may generate aggregate latency sensitivity score 303 based on individual latency sensitivity scores 301 for traffic 201. For example, LRCS 105 may average scores 301-1, 301-2, 301-3, may compute a median of these scores 301, and/or may perform some other function or computation in order to generate aggregate latency sensitivity score 303 for traffic 201-1, 201-2, and 201-3.

In some embodiments, traffic 201-1, 201-2, and 201-3 may be grouped in any suitable manner, and therefore aggregate latency sensitivity score 303 may be generated for such grouping. Thus, while an example of one aggregate latency sensitivity score 303 is shown for one grouping of traffic (e.g., traffic 201-1, 201-2, and 201-3), in practice multiple aggregate latency sensitivity scores 303 may be generated for multiple groupings, categories, classifications, etc. of traffic.

Figure 4:
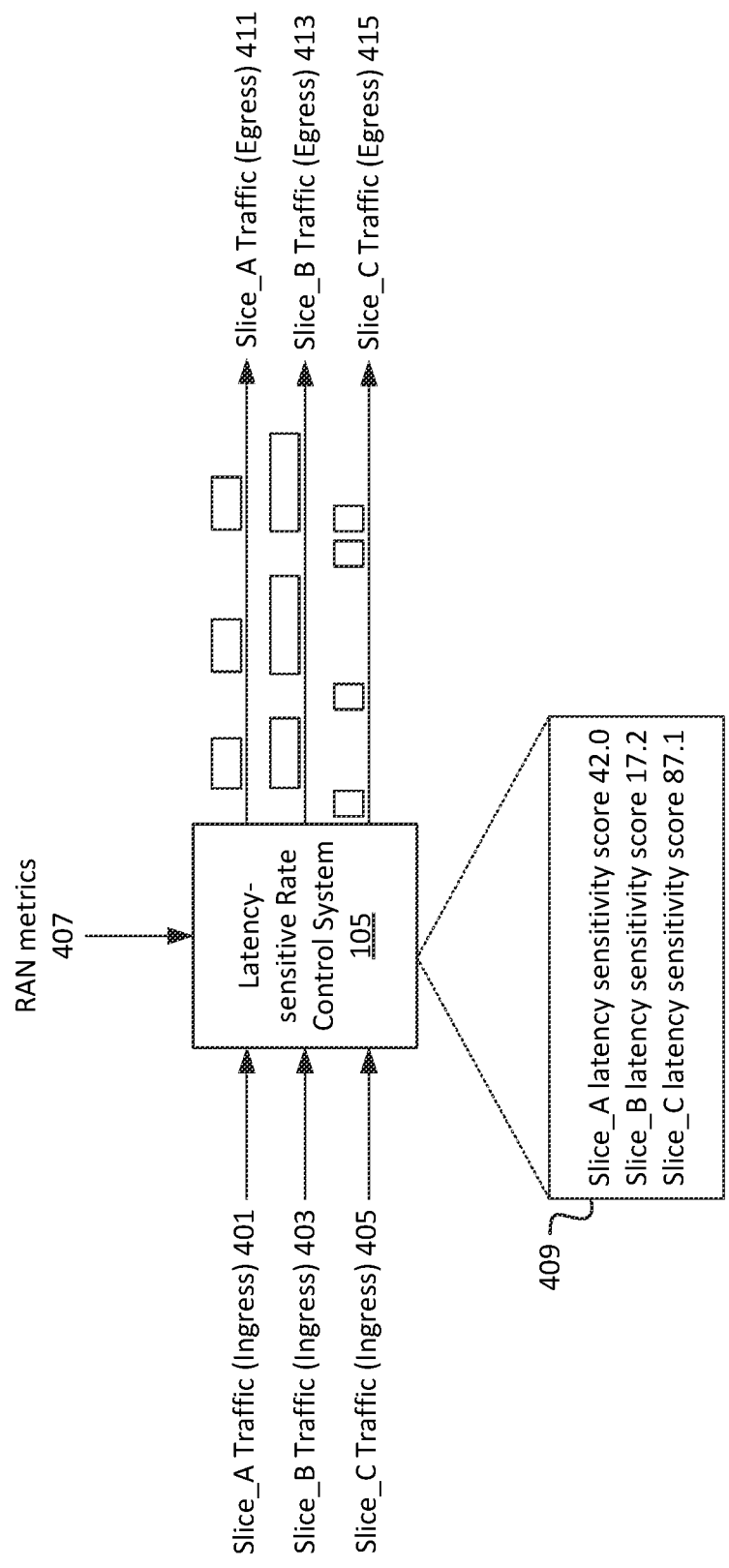
FIG. 4 illustrates an example of the generation of different latency scores for traffic associated with different network slices, in accordance with one or more embodiments described herein.

For example, as shown in FIG. 4, traffic may be grouped, categorized, etc. based on network slice, and latency sensitivity scores may be determined on a per-network slice basis. In practice, other attributes of traffic may be used for such grouping in addition to, or in lieu of, a per-network slice basis (e.g., a per-traffic type or application basis, a per-UE basis, etc.). As shown, traffic 401 may be associated with a first network slice (referred to as "Slice_A"), traffic 403 may be associated with a second network slice (referred to as "Slice_B"), and traffic 405 may be associated with a third network slice (referred to as "Slice_C"). Traffic 401-405 may be "ingress" traffic with respect to LRCS 105, as such traffic 401-405 may be received from network 101 for routing and/or forwarding to one or more destinations (e.g., one or more base stations 103). As similarly described above, LRCS 105 may also receive RAN metrics 407 associated with one or more base stations 103 to which traffic 401-405 is to be routed, forwarded, etc.

LRCS 105 may generate a set of latency sensitivity scores 409 for traffic 401-405 based on respective attributes of traffic 401-405, as well as based on RAN metrics 407. For example, LRCS 105 may generate an example latency sensitivity score of 42.0 for traffic 401, an example latency sensitivity score of 17.2 for traffic 403, and an example latency sensitivity score of 87.1 for traffic 405.

LRCS 105 output egress traffic 411-415. For example, traffic 411 may be a rate-controlled output of traffic 401, traffic 413 may be a rate-controlled output of traffic 403, and traffic 415 may be a rate-controlled output of traffic 415. As discussed above, the rate at which traffic 411-415 is output may be based on the respective latency sensitivity scores 409, RAN metrics 407, and/or an ingress capacity of a respective base station 103 to which traffic 411-415 is to be forwarded.

The different rates at which respective traffic 411-415 is output is reflected in FIG. 4 as differently sized and spaced rectangles. Such rectangles may correspond to packets and/or groups of packets, where a larger rectangle may correspond to a larger amount of data sent in a given time period, and the spacing in between these rectangles may correspond to an amount of time between the sending of respective packets and/or groups of packets. For example, each rectangle may correspond to a "burst" of traffic. In practice, the rate may be controlled in a different manner, and/or the rate control may be represented in some different manner.

Figure 5:
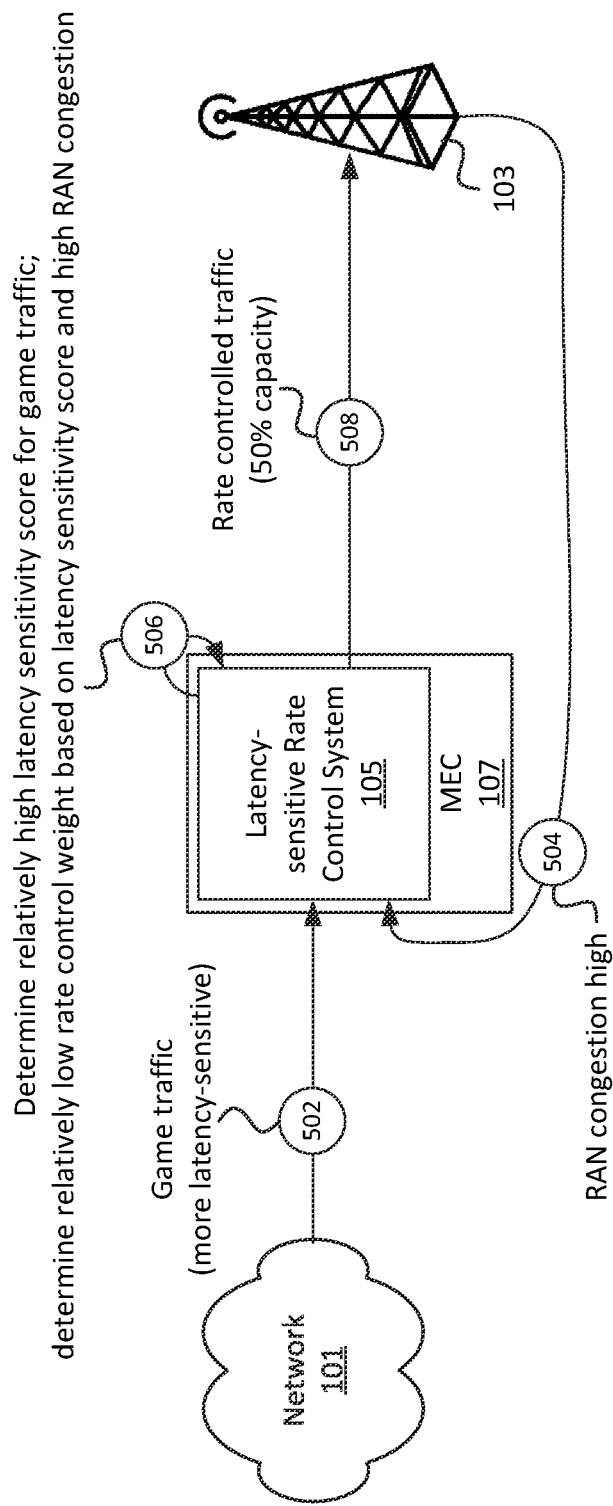
FIGS. 5-7 illustrate example scenarios in which traffic may be provided to a base station of a RAN based on latency sensitivity of the traffic and RAN metrics, in accordance with one or more embodiments described herein.
Figure 6:
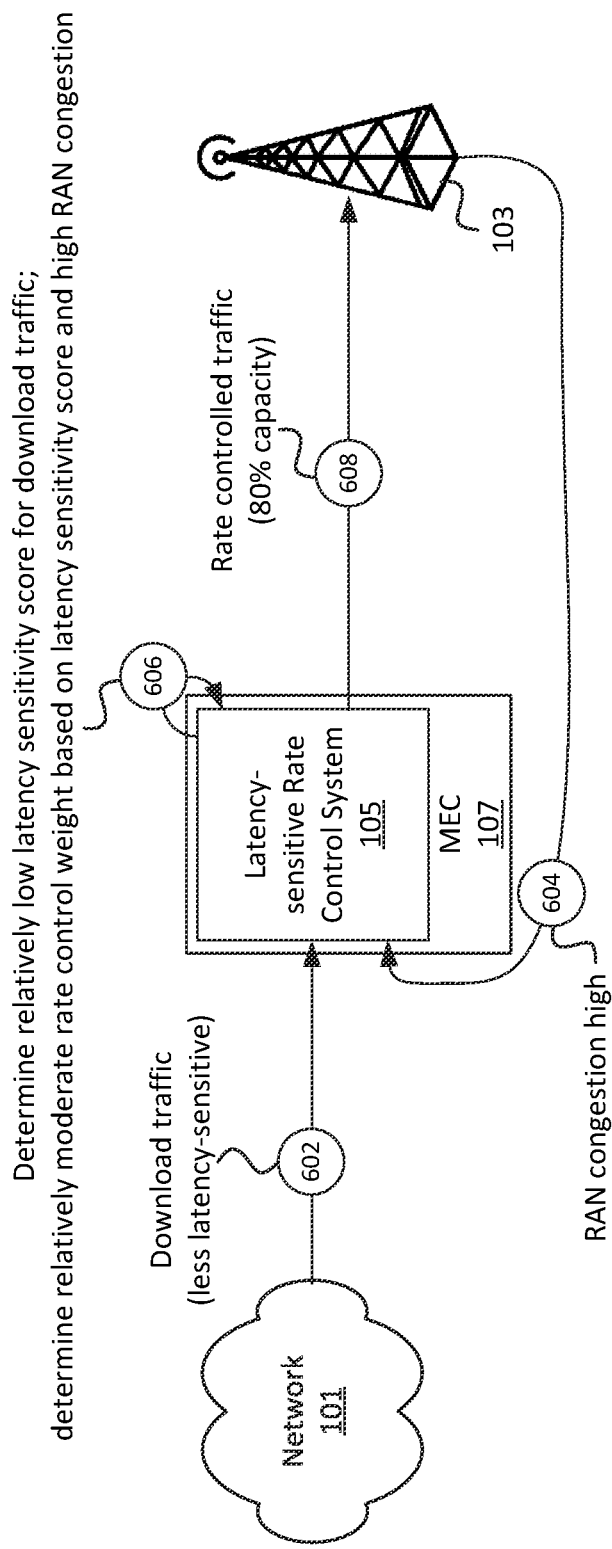
Figure 7:
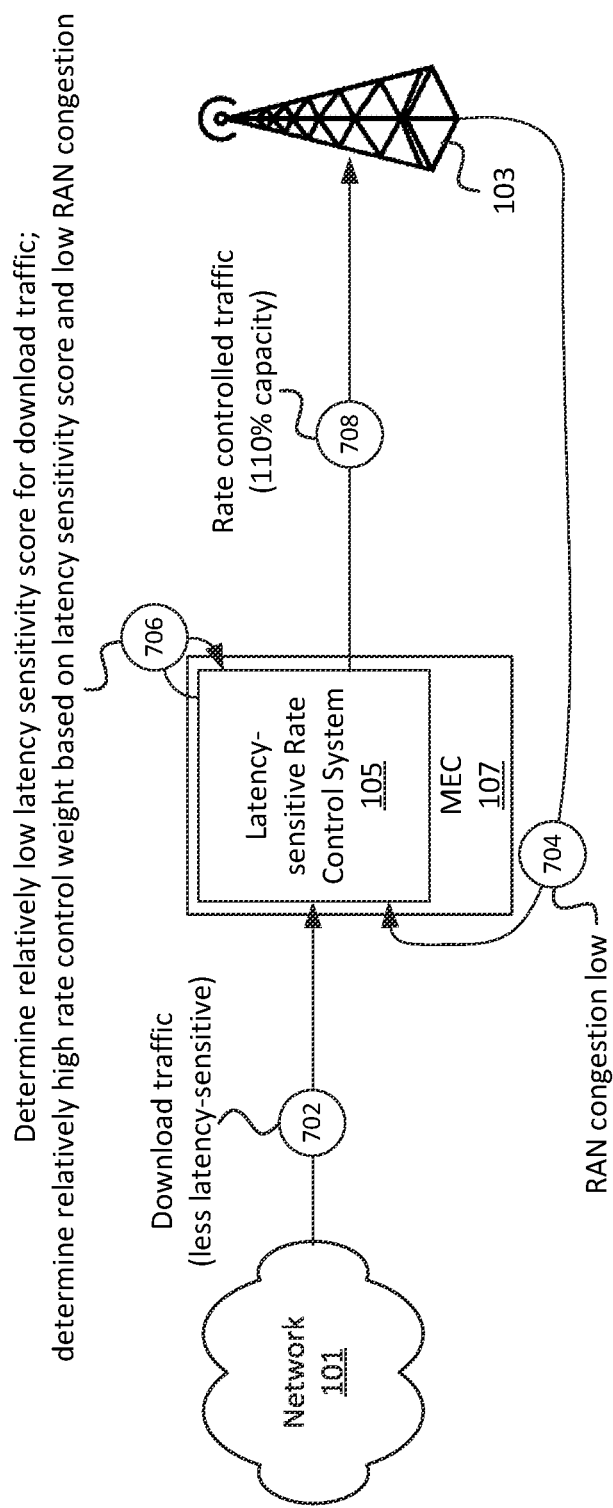

FIGS. 5-7 illustrate examples of particular rate controlled output of traffic that may be performed by LRCS 105 under different circumstances. While FIGS. 5-7 are illustrated as separate figures, in practice, the operations shown in some or all of FIGS. 5-7 may be performed concurrently and/or by the same LRCS 105 (e.g., as similarly shown in FIG. 4).

As shown in FIG. 5, LRCS 105 may receive (at 502) game traffic, which may be relatively latency-sensitive. LRCS 105 may also receive (at 504) RAN metrics indicating that a measure of congestion associated with base station 103 is relatively high. For example, a relatively large quantity of UEs 109 may be connected to base station 103, an ingress buffer associated with base station 103 may be full or nearing capacity, etc. LRCS 105 may determine (at 506) that the traffic (received at 502) is associated with a relatively high latency sensitivity score (e.g., based on including game traffic), and may further identify that base station 103 is relatively congested. In this situation, since a measure of congestion associated with base station 103 is relatively high, the likelihood of traffic being dropped or delayed at base station 103 may be relatively high. Further, since the received (at 502) traffic is relatively latency-sensitive, LRCS 105 may determine a relatively low rate control weight in this situation, in order to minimize the likelihood that the traffic will be dropped or delayed at base station 103. As similarly discussed above, the rate control weight may be applied to an ingress capacity associated with base station 103 in order to ultimately determine a rate at which the traffic should be forwarded to base station 103. Thus, the determined rate at which LRCS 105 outputs (at 508) the traffic to base station 103 may be lower than the ingress capacity associated with base station 103. In this example, the output rate may be 50% of the ingress capacity of base station 103.

As shown in FIG. 6, LRCS 105 may receive (at 602) file download traffic, which may be relatively less latency-sensitive or latency-insensitive. LRCS 105 may also receive (at 604) RAN metrics indicating that a measure of congestion associated with base station 103 is relatively high. LRCS 105 may determine (at 606) that the traffic (received at 602) is associated with a relatively low latency sensitivity score (e.g., based on including file download traffic), and may further identify that base station 103 is relatively congested. In this situation, since a measure of congestion associated with base station 103 is relatively high, the likelihood of traffic being dropped or delayed at base station 103 may be relatively high. However, since the received (at 602) traffic is relatively less latency-sensitive, LRCS 105 may determine a relatively moderate (e.g., higher than the weight determined in the example of FIG. 5, but lower than a maximum value) rate control weight in this situation, which may favor throughput of the traffic over latency. For example, even if traffic is dropped or delayed at base station 103, such dropping or delaying of the traffic may have less of a detrimental impact on a user experience than the dropping or delaying of more latency-sensitive traffic.

As similarly discussed above, the rate control weight may be applied to an ingress capacity associated with base station 103 in order to ultimately determine a rate at which the traffic should be forwarded to base station 103. Thus, the determined rate at which LRCS 105 outputs (at 608) the traffic to base station 103 may be lower than the ingress capacity associated with base station 103, but may be higher than the rate (at 508) in the example of FIG. 5. For example, in the example of FIG. 6, the traffic may be output at 80% of the ingress rate of base station 103, where this higher rate is based on the less latency-sensitive nature of the file download traffic (received at 602) than the game traffic (received at 502). However, the rate (e.g., 80% of ingress capacity of base station 103) but may be less than the full ingress capacity of base station 103 based on the relatively high congestion associated with base station 103.

In the example of FIG. 7, LRCS 105 may receive (at 702) relatively less latency-sensitive traffic (e.g., file download traffic, as similarly discussed with respect to FIG. 6), and may receive (at 704) an indication that congestion associated with base station 103 is relatively low. For example, a relatively low quantity of UEs 109 may be connected to base station 103, an ingress buffer associated with base station 103 may have a relatively large amount of available space, etc. Accordingly, LRCS 105 may determine (at 706) a relatively high rate control weight for the traffic, based on a relatively low latency sensitivity score associated with the traffic and further based on the low congestion associated with base station 103. In this example, LRCS 105 may determine a rate control weight of 110% of the ingress capacity of base station 103, and may output (at 708) the traffic at this rate. Thus, although base station 103 may drop or delay some of the received traffic, the dropping and/or delaying may not be as detrimental or noticeable to a user due to the relative latency-insensitivity of the traffic.

Figure 8:
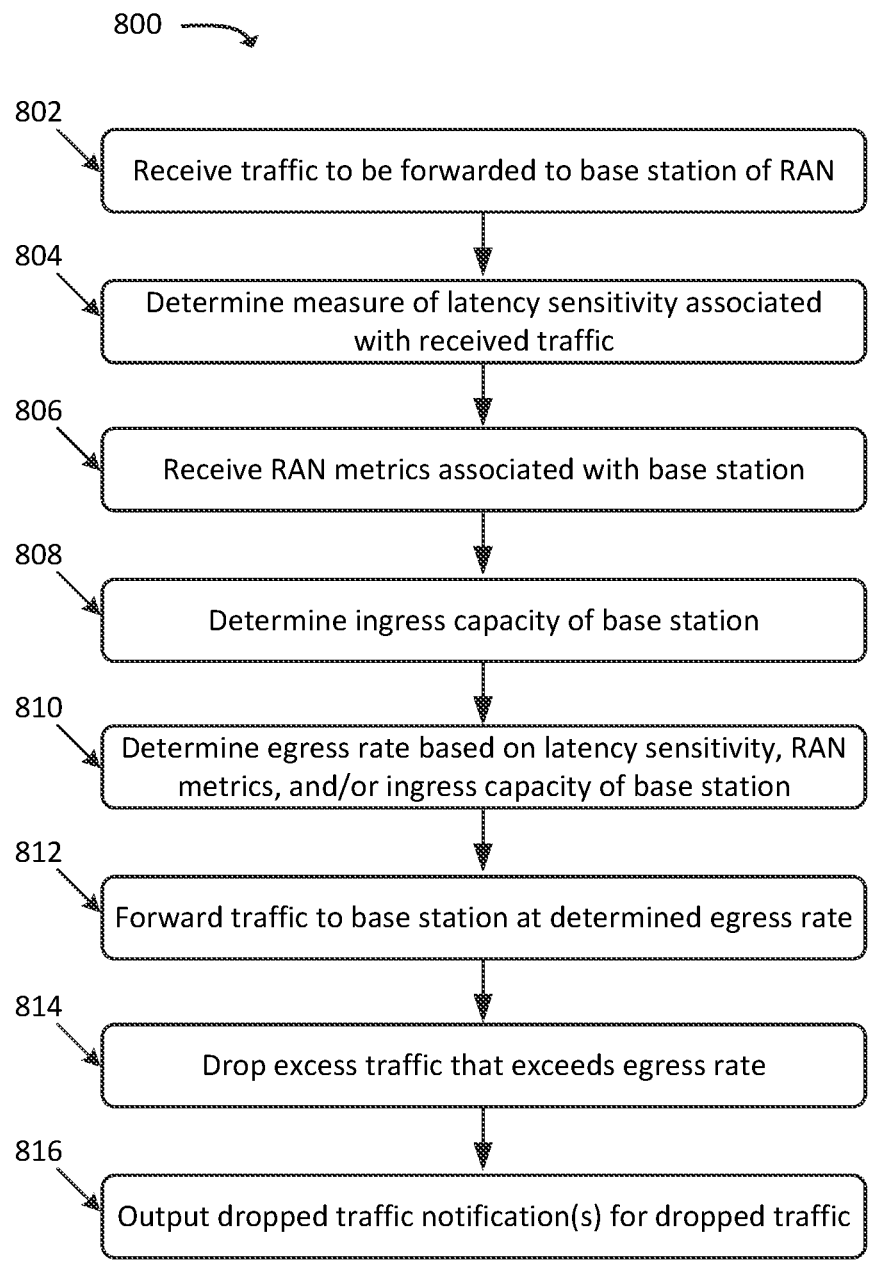
FIG. 8 illustrates an example process for forwarding rate-controlled traffic to a base station of a RAN in accordance with some embodiments.

FIG. 8 illustrates an example process 800 for forwarding rate-controlled traffic to a base station of a RAN in accordance with some embodiments. In some embodiments, some or all of process 800 may be performed by LRCS 105. In some embodiments, one or more other devices may perform some or all of process 800 (e.g., in concert with, and/or in lieu of, LRCS 105).

As shown, process 800 may include receiving (at 802) traffic to be forwarded to a base station of a RAN. For example, as similarly discussed above, LRCS 105 may receive traffic (e.g., from network 101, and/or one or more components thereof such as a router, a switch, a UPF, a PGW (e.g., a PGW-U), and/or some other suitable network device) to be routed to base station 103.

Process 800 may further include determining (at 804) a measure of latency sensitivity associated with the received traffic. For example, as discussed above, the traffic may have associated attributes (e.g., slice information 203, application information 205, flow information 207, UE information 209) based on which a measure of latency sensitivity, such as a latency category or latency sensitivity score, may be generated or otherwise determined. The information included in and/or derived from header information (e.g., IP header information, Transmission Control Protocol ("TCP") header information, and/or other suitable header information), payload information, and/or information provided from another source (e.g., not necessarily derived from the traffic itself).

Process 800 may additionally include receiving (at 806) RAN metrics associated with base station 103. For example, as discussed above, the RAN metrics may include congestion and/or load metrics, RF metrics (e.g., channel or signal quality metrics, interference metrics, etc.), and/or other suitable metrics describing conditions of base station 103 that may affect the wireless transmission of traffic to one or more UEs 109 connected to base station 103.

Process 800 may also include determining (at 808) an ingress capacity of base station 103. For example, the ingress capacity may be a static value, and/or may be a dynamic value (e.g., determined, adjusted, refined, etc. using AI/ML techniques or other suitable techniques), as described above. The ingress capacity may describe a throughput at which base station 103 is able to handle incoming traffic for eventual wireless transmission to connected UEs 109. Generally, received traffic that exceeds the ingress capacity may be more likely to be dropped and/or delayed as compared to traffic that is at or below the ingress capacity. When receiving traffic at lower rates than the ingress capacity, such traffic may be generally less likely to be dropped and/or delayed by base station 103.

Process 800 may further include determining (at 810) an egress rate based on the latency sensitivity of the received traffic, the RAN metrics, and/or the ingress capacity of base station 103. For example, as discussed above, LRCS 105 may determine a rate control weight based on the latency sensitivity of the traffic and the RAN metrics, and may apply the weight to the ingress capacity of base station 103. In some situations, the determined egress rate for LRCS 105 may be a lower rate than an ingress rate associated with LRCS 105 (e.g., a rate at which the traffic was received from network 101).

Process 800 may additionally include forwarding (at 812) at least a portion of the traffic to base station 103 at the determined egress rate. For example, as discussed above, LRCS 105 may forward a portion of the traffic, received from network 101, to base station 103 at the determined egress rate, which may be a lower rate than a rate at which the traffic was received from network 101. As discussed above, base station 103 may buffer and/or queue the traffic and may schedule the traffic for wireless transmission to its destination (e.g., a particular UE 109 connected to base station 103). As discussed above, when base station 103 buffers and/or queues less traffic, the traffic that is buffered and/or queued may be delivered with a lower likelihood of delays, jitter, and/or packet loss than when base station 103 buffers and/or queues more traffic. When base station 103 buffers and/or queues more traffic, base station 103 may be more likely to utilize more PRBs, thereby increasing overall traffic throughput.

Process 800 may also include dropping (at 814) excess traffic that exceeds the egress rate. For example, in situations where the determined egress rate exceeds an ingress rate at which the traffic was received by LRCS 105, LRCS 105 may drop some of the received traffic that is in excess of the determined egress rate. In some embodiments, LRCS 105 may queue and/or buffer such excess traffic and may forward such queued and/or buffered traffic to base station 103 in accordance with the determined rate. In some embodiments, LRCS 105 may drop traffic that has been queued and/or buffered in such a manner, if the traffic has been queued and/or buffered for at least a threshold amount of time. In this manner, by managing or limiting the threshold amount of time, LRCS 105 may reduce or eliminate the possibility of introducing excess latency to such traffic. In some embodiments, the threshold amount of time may be based on the latency sensitivity of the traffic. For example, if traffic is relatively latency-sensitive, the threshold time may be relatively small or 0, while the threshold time may be relatively large or unlimited for less latency-sensitive traffic.

Process 800 may further include outputting (at 816) dropped traffic notifications for the dropped traffic. For example, LRCS 105 may output, to a source of the traffic and via network 101, a NACK and/or some other indication that the traffic was dropped. The source may then retry to send the traffic, and/or may otherwise handle the non-delivery of the traffic in a suitable manner.

Figure 9:
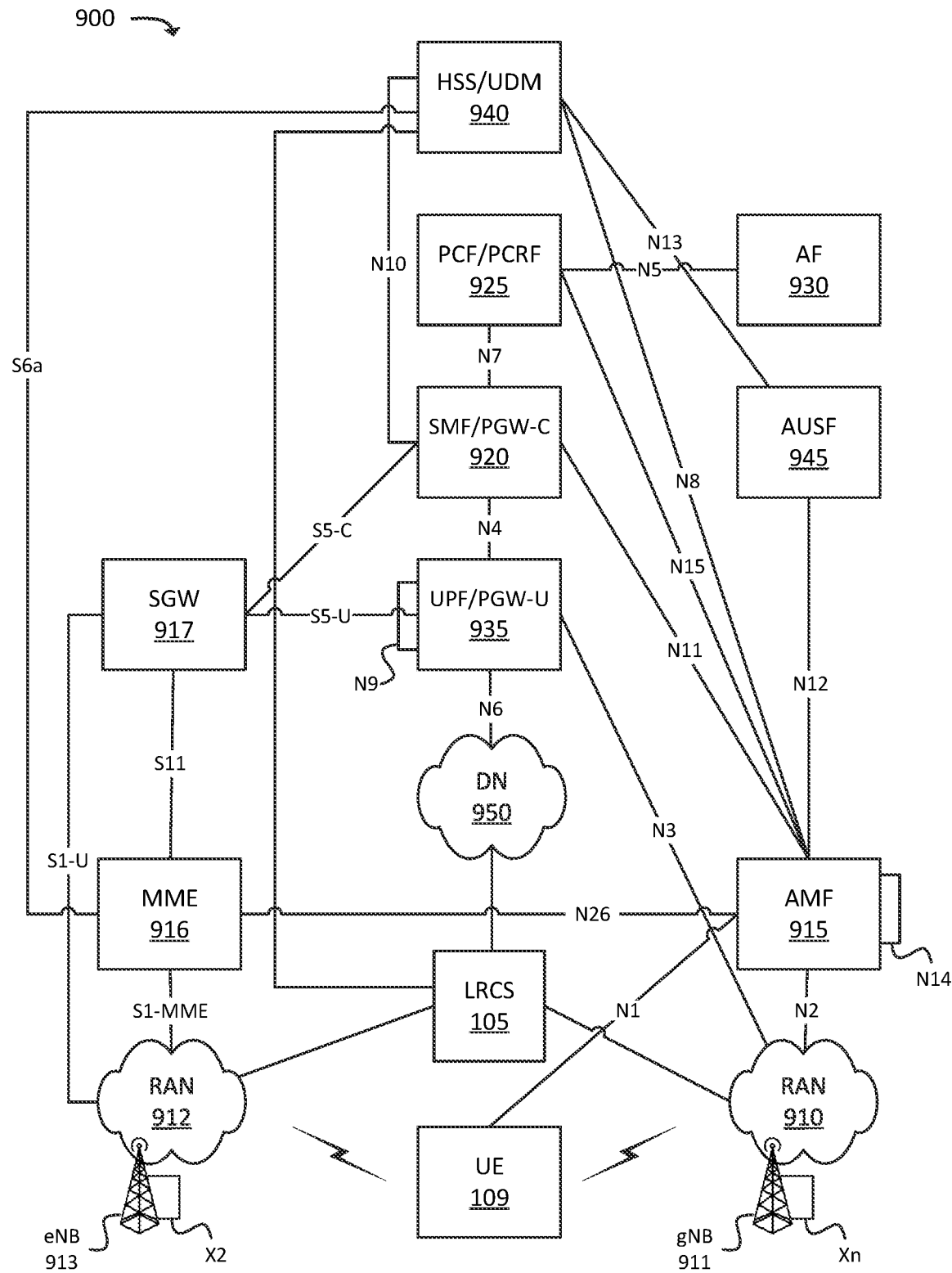
FIG. 9 illustrates an example environment in which one or more embodiments, described herein, may be implemented.

FIG. 9 illustrates an example environment 900, in which one or more embodiments may be implemented. In some embodiments, environment 900 may correspond to a 5G network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an EPC). As shown, environment 900 may include UE 109, RAN 910 (which may include one or more gNBs 911), RAN 912 (which may include one or more one or more eNBs 913), and various network functions such as Access and Mobility Management Function ("AMF") 915, Mobility Management Entity ("MME") 916, Serving Gateway ("SGW") 917, Session Management Function ("SMF")/ Packet Data Network ("PDN") Gateway ("PGW")-Control plane function ("PGW-C") 920, Policy Control Function ("PCF")/Policy Charging and Rules Function ("PCRF") 925, Application Function ("AF") 930, UPF/PGW-U 935, HSS/UDM 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as LRCS 105.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/ PCRF 925, UPF/PGW-U 935, HSS/UDM 940, and/or 945, while another slice may include a second instance of SMF/ PGW-C 920, PCF/PCRF 925, UPF/PGW-U 935, HSS/UDM 940, and/or 945). As noted above, the different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 109 may include a computation and communication device, such as a wireless mobile communication device that is capable of communicating with RAN 910, RAN 912, and/or DN 950. UE 109 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 109 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 109 may communicate with one or more other elements of environment 900. UE 109 may communicate with RAN 910 via an air interface (e.g., as provided by gNB 911). For instance, RAN 910 may receive traffic (e.g., voice call traffic, data traffic, messaging traffic, signaling traffic, etc.) from UE 109 via the air interface, and may communicate the traffic to UPF/PGW-U 935, and/or one or more other devices or networks. Similarly, RAN 910 may receive traffic intended for UE 109 (e.g., from UPF/PGW-U 935, AMF 915, and/or one or more other devices or networks) and may communicate the traffic to UE 109 via the air interface. In some embodiments, base station 103 may be, may include, and/or may be implemented by one or more gNBs 911.

RAN 912 may be, or may include, a LTE RAN that includes one or more base stations (e.g., one or more eNBs 913), via which UE 109 may communicate with one or more other elements of environment 900. UE 109 may communicate with RAN 912 via an air interface (e.g., as provided by eNB 913). For instance, RAN 910 may receive traffic (e.g., voice call traffic, data traffic, messaging traffic, signaling traffic, etc.) from UE 109 via the air interface, and may communicate the traffic to UPF/PGW-U 935, and/or one or more other devices or networks. Similarly, RAN 910 may receive traffic intended for UE 109 (e.g., from UPF/PGW-U 935, SGW 917, and/or one or more other devices or networks) and may communicate the traffic to UE 109 via the air interface. In some embodiments, base station 103 may be, may include, and/or may be implemented by one or more eNBs 913.

AMF 915 may include one or more devices, systems, Virtualized Network Functions ("VNFs"), etc., that perform operations to register UE 109 with the 5G network, to establish bearer channels associated with a session with UE 109, to hand off UE 109 from the 5G network to another network, to hand off UE 109 from the other network to the 5G network, manage mobility of UE 109 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 109 with the EPC, to establish bearer channels associated with a session with UE 109, to hand off UE 109 from the EPC to another network, to hand off UE 109 from another network to the EPC, manage mobility of UE 109 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 109. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 109, from DN 950, and may forward the user plane data toward UE 109 (e.g., via RAN 910, SMF/PGW-C 920, and/or one or more other devices). In some embodiments, multiple UPFs 935 may be deployed (e.g., in different geographical locations), and the delivery of content to UE 109 may be coordinated via the N9 interface (e.g., as denoted in FIG. 9 by the line marked "N9" originating and terminating at UPF/PGW-U 935). Similarly, UPF/PGW-U 935 may receive traffic from UE 109 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 109.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 109 may communicate, through DN 950, with data servers, other UEs 109, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 109 may communicate.

LRCS 105 may include one or more devices, systems, VNFs, etc. that perform one or more operations described herein. For example, LRCS 105 may forward rate-controlled traffic (e.g., as received from UPF/PGW-U 935 or some other source) to gNB 911 and/or eNB 913, where the rate of the forwarding of the traffic may be based on a latency sensitivity of the traffic, metrics associated with gNB 911 and/or eNB 913, and an ingress capacity of gNB 911 and/or eNB 913. In some embodiments, LRCS 105 may be implemented at a router, hub, switch, and/or other device or system that routes or forwards user plane traffic. In some embodiments, LRCS 105 may be implemented by a MEC 107. In some embodiments, LRCS 105 may be implemented by the same device or system that implements some or all of the functionality of one or more gNBs 911 and/or eNBs 913.

Figure 10:
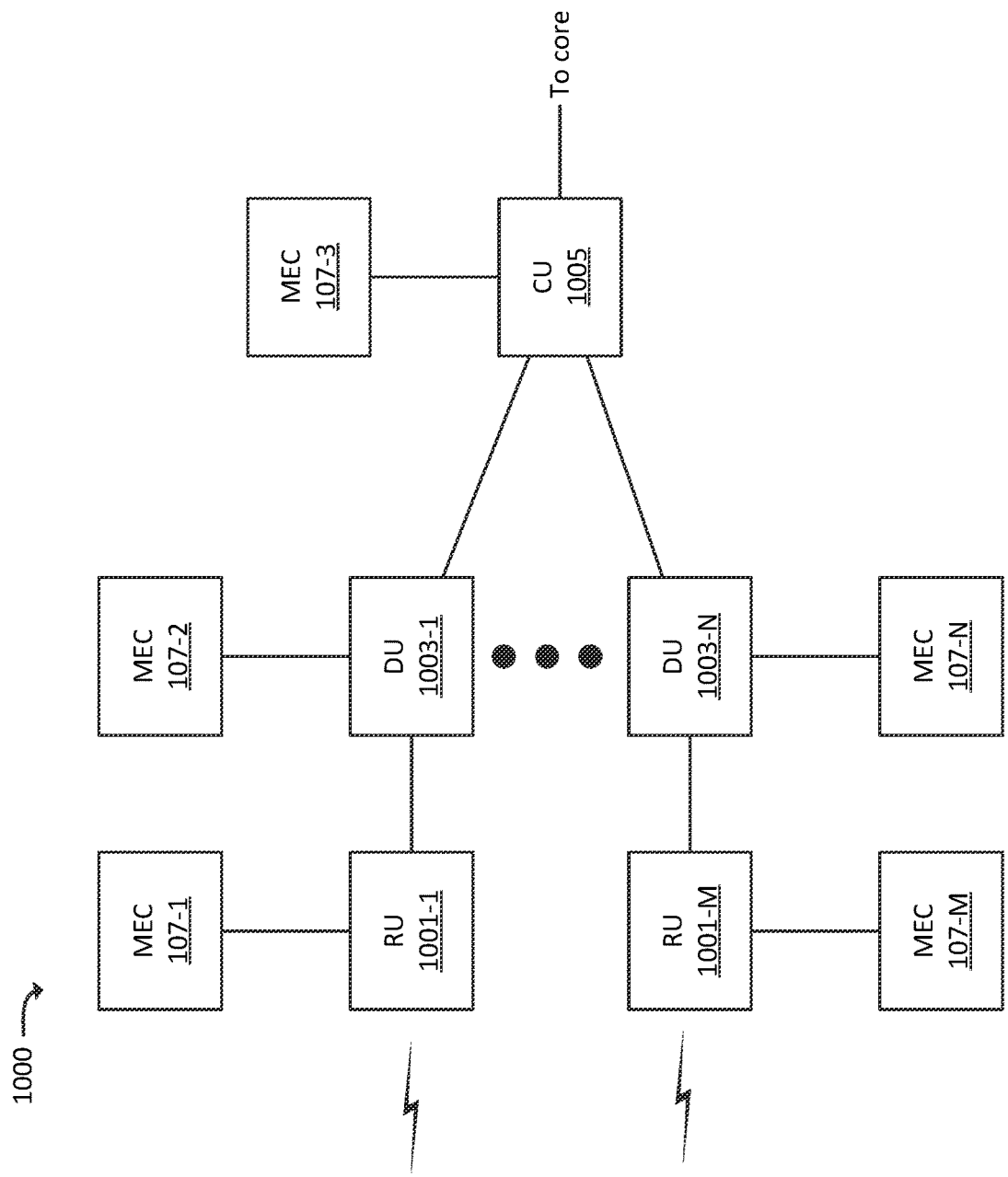
FIG. 10 illustrates an example arrangement of a RAN, in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 109 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 109, and may determine which DU(s) 1003 should receive the downlink traffic. DU 1003 may include one or more devices that transmit traffic between a core network (e.g., via CU 1005) and UE 109 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 109.

RU 1001 may include hardware circuitry (e.g., one or more RF transceivers, antennas, radios, and/or other suitable hardware) to communicate wirelessly (e.g., via an RF interface) with one or more UEs 109, one or more other DUs 1003 (e.g., via RUs 1001 associated with DUs 1003), and/or any other suitable type of device. In the uplink direction, RU 1001 may receive traffic from UE 109 and/or another DU 1003 via the RF interface and may provide the traffic to DU 1003. In the downlink direction, RU 1001 may receive traffic from DU 1003, and may provide the traffic to UE 109 and/or another DU 1003.

RUs 1001 may, in some embodiments, be communicatively coupled to one or more Multi-Access/Mobile Edge Computing ("MEC") devices, referred to sometimes herein simply as "MECs" 107. For example, RU 1001-1 may be communicatively coupled to MEC 107-1, RU 1001-M may be communicatively coupled to MEC 107-M, DU 1003-1 may be communicatively coupled to MEC 107-2, DU 1003-N may be communicatively coupled to MEC 107-N, CU 1005 may be communicatively coupled to MEC 107-3, and so on. MECs 107 may include hardware resources (e.g., configurable or provisionable hardware resources) that may be configured to provide services and/or otherwise process traffic to and/or from UE 109, via a respective RU 1001.

For example, RU 1001-1 may route some traffic, from UE 109, to MEC 107-1 instead of to a core network (e.g., via DU 1003 and CU 1005). MEC 107-1 may process the traffic, perform one or more computations based on the received traffic, and may provide traffic to UE 109 via RU 1001-1. In this manner, ultra-low latency services may be provided to UE 109, as traffic does not need to traverse DU 1003, CU 1005, and an intervening backhaul network between DU network 1000 and the core network. In some embodiments, MEC 107 may include, and/or may implement, some or all of the functionality described above with respect to LRCS 105.

Figure 11:
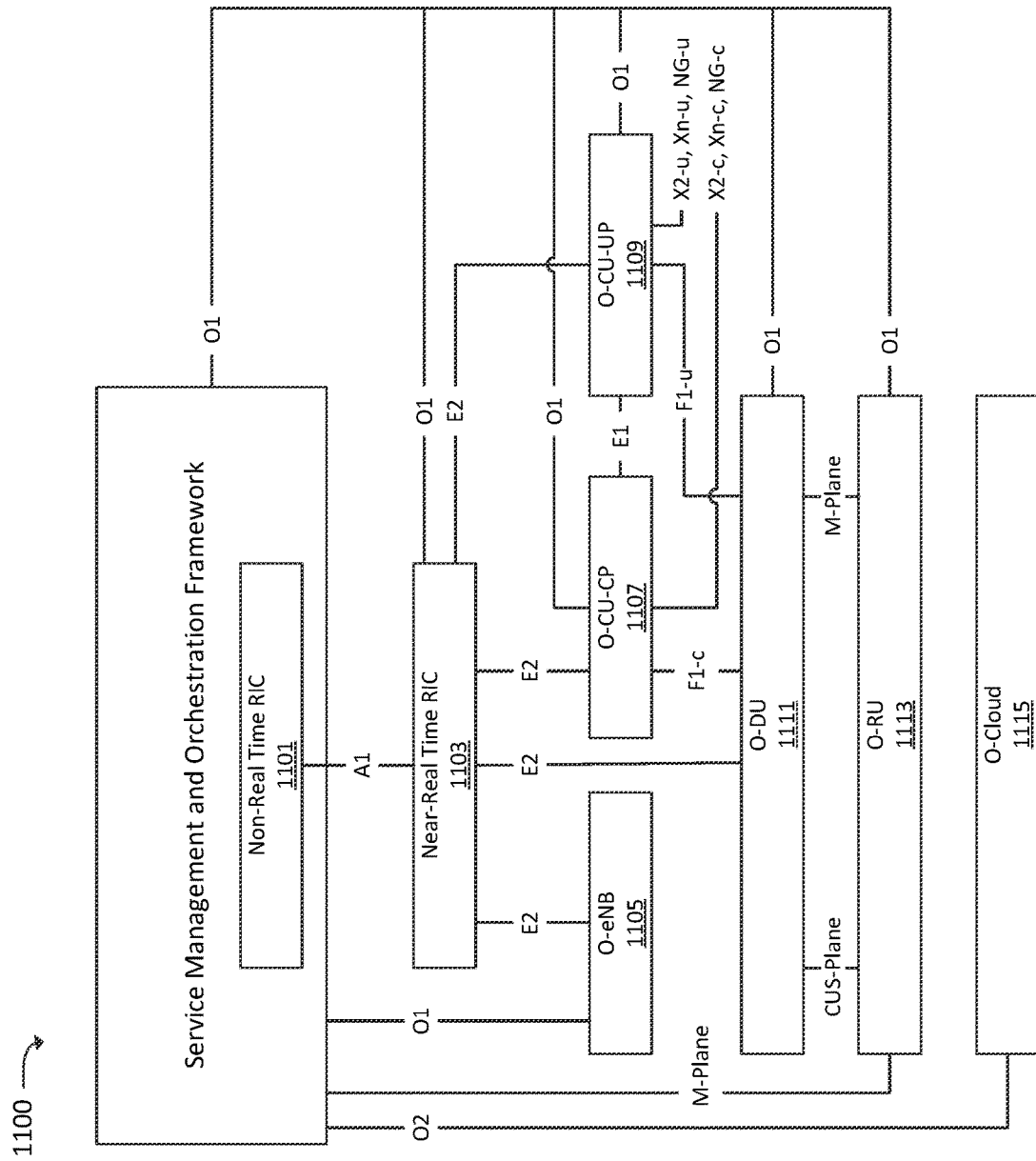
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 107.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time MC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time MC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 109 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 107, which may provide services, and may be communicatively coupled, to O-CU-CP 1107, O-CU-UP 1109, O-DU 1111, and/or O-RU 1113 (e.g., via an O1 and/or O2 interface).

Figure 12:
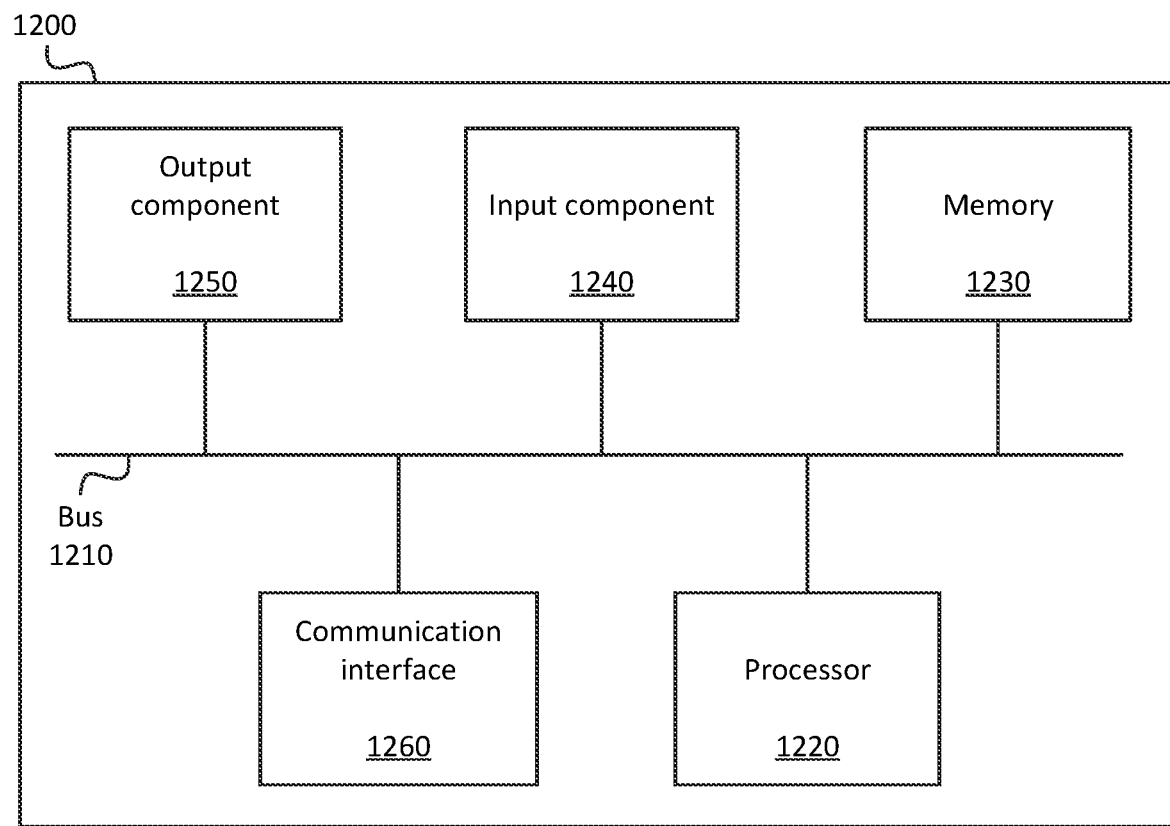
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive traffic to be forwarded to one or more User Equipment ("UEs") via a base station of a radio access network ("RAN");
determine a measure of latency sensitivity associated with the traffic;
receive metrics associated with the base station of the RAN;
determine a rate control weight based on:
the measure of latency sensitivity associated with the traffic, and the metrics associated with the base station of the RAN;
determine an ingress capacity rate of the base station of the RAN;
determine an egress rate based on the rate control weight and the ingress capacity rate of the base station of the RAN, wherein the egress rate is different from the ingress capacity rate of the base station of the RAN; and
forward at least a portion of the traffic, at the determined egress rate, to the base station of the RAN, wherein the base station outputs the portion of the traffic to the one or more UEs.

2. The device of claim 1, wherein the traffic is received from at least one of:
a User Plane Function ("UPF"),
a Packet Data Network ("PDN") gateway ("PGW"), or
a Serving Gateway ("SGW").

3. The device of claim 1, wherein the determined egress rate is a first rate, wherein the traffic is received at a second rate that is different from the first rate.

4. The device of claim 3, wherein the second rate is a faster rate than the first rate, wherein the portion of the traffic is a first portion, and wherein the one or more processors are further configured to:
drop at least a second portion of the traffic without forwarding the second portion of the traffic to the base station.

5. The device of claim 1, wherein determining the measure of latency sensitivity associated with the traffic is based on at least one of:
a network slice associated with the traffic,
a source specified in header information of the traffic,
a destination specified in header information of the traffic,
a Quality of Service ("QoS") flow associated with the traffic, or
an application associated with the traffic.

6. The device of claim 1, wherein the metrics associated with the base station of the RAN include at least one of:
a measure of utilization or capacity of one or more ingress queues associated with the base station,
a quantity of User Equipment ("UEs") connected to the base station, or
signal quality metrics associated with the base station.

7. The device of claim 1, wherein the base station performs one or more further scheduling operations with respect to the received portion prior to outputting the portion of the traffic to the one or more UEs.

8. A non-transitory computer-readable medium, storing a plurality of processor-executable instructions to:
receive traffic to be forwarded to one or more User Equipment ("UEs") via a base station of a radio access network ("RAN");
determine a measure of latency sensitivity associated with the traffic;
receive metrics associated with the base station of the RAN;
determine a rate control weight based on:
the measure of latency sensitivity associated with the traffic, and
the metrics associated with the base station of the RAN;
determine an ingress capacity rate of the base station of the RAN;
determine an egress rate based on the rate control weight and the ingress capacity rate of the base station of the RAN, wherein the egress rate is different from the ingress capacity rate of the base station of the RAN; and
forward at least a portion of the traffic, at the determined egress rate, to the base station of the RAN, wherein the base station outputs the portion of the traffic to the one or more UEs.

9. The non-transitory computer-readable medium of claim 8, wherein the traffic is received from at least one of:
a User Plane Function ("UPF"),
a Packet Data Network ("PDN") gateway ("PGW"), or
a Serving Gateway ("SGW").

10. The non-transitory computer-readable medium of claim 8, wherein the determined egress rate is a first rate, wherein the traffic is received at a second rate that is different from the first rate.

11. The non-transitory computer-readable medium of claim 10, wherein the second rate is a faster rate than the first rate, wherein the portion of the traffic is a first portion, and wherein the plurality of processor-executable instructions further include processor-executable instructions to:
drop at least a second portion of the traffic without forwarding the second portion of the traffic to the base station.

12. The non-transitory computer-readable medium of claim 8, wherein determining the measure of latency sensitivity associated with the traffic is based on at least one of:
a network slice associated with the traffic,
a source specified in header information of the traffic,
a destination specified in header information of the traffic,
a Quality of Service ("QoS") flow associated with the traffic, or
an application associated with the traffic.

13. The non-transitory computer-readable medium of claim 8, wherein the metrics associated with the base station of the RAN include at least one of:
a measure of utilization or capacity of one or more ingress queues associated with the base station,
a quantity of User Equipment ("UEs") connected to the base station, or
signal quality metrics associated with the base station.

14. The non-transitory computer-readable medium of claim 8, wherein the base station performs one or more further scheduling operations with respect to the received portion prior to outputting the portion of the traffic to the one or more UEs.

15. A method, comprising:
receiving traffic to be forwarded to one or more User Equipment ("UEs") via a base station of a radio access network ("RAN");
determining a measure of latency sensitivity associated with the traffic;
receiving metrics associated with the base station of the RAN;
determining a rate control weight based on:
the measure of latency sensitivity associated with the traffic, and
the metrics associated with the base station of the RAN;
determining an ingress capacity rate of the base station of the RAN;
determining an egress rate based on the rate control weight and the ingress capacity rate of the base station of the RAN, wherein the egress rate is different from the ingress capacity rate of the base station of the RAN; and
forwarding at least a portion of the traffic, at the determined egress rate, to the base station of the RAN, wherein the base station outputs the portion of the traffic to the one or more UEs.

16. The method of claim 15, wherein the traffic is received from at least one of:
- a User Plane Function ("UPF"),
- a Packet Data Network ("PDN") gateway ("PGW"), or
- a Serving Gateway ("SGW").

17. The method of claim 15, wherein the determined egress rate is a first rate, wherein the traffic is received at a second rate that is faster than the first rate, wherein the portion of the traffic is a first portion, the method further comprising:
- dropping at least a second portion of the traffic without forwarding the second portion of the traffic to the base station.

18. The method of claim 15, wherein determining the measure of latency sensitivity associated with the traffic is based on at least one of:
- a network slice associated with the traffic,
- a source specified in header information of the traffic,
- a destination specified in header information of the traffic,
- a Quality of Service ("QoS") flow associated with the traffic, or
- an application associated with the traffic.

19. The method of claim 15, wherein the metrics associated with the base station of the RAN include at least one of:
- a measure of utilization or capacity of one or more ingress queues associated with the base station,
- a quantity of User Equipment ("UEs") connected to the base station, or
- signal quality metrics associated with the base station.

20. The method of claim 15, wherein the base station performs one or more further scheduling operations with respect to the received portion prior to outputting the portion of the traffic to the one or more UEs.

* * * * *